(12) United States Patent
Houssat et al.

(10) Patent No.: US 11,958,443 B2
(45) Date of Patent: Apr. 16, 2024

(54) WIPER BLADE REPLACEMENT KIT

(71) Applicant: Valeo Systèmes d'Essuyage, Le Mesnil Saint Denis (FR)

(72) Inventors: Stéphane Houssat, Issoire (FR); Vincent Gaucher, Issoire (FR); Guillaume Mouleyre, Issoire (FR); Olivier Jomard, Issoire (FR); Julien Carrion, Issoire (FR)

(73) Assignee: VALEO SYSTÈMES D'ESSUYAGE, Le Mesnil Saint Denis (FR)

( * ) Notice: Subject to any disclaimer, the term of this patent is extended or adjusted under 35 U.S.C. 154(b) by 133 days.

(21) Appl. No.: 17/418,069

(22) PCT Filed: Nov. 28, 2019

(86) PCT No.: PCT/EP2019/082977
§ 371 (c)(1),
(2) Date: Jun. 24, 2021

(87) PCT Pub. No.: WO2020/135970
PCT Pub. Date: Jul. 2, 2020

(65) Prior Publication Data
US 2022/0097653 A1  Mar. 31, 2022

(30) Foreign Application Priority Data
Dec. 26, 2018 (FR) .................................. 1874190

(51) Int. Cl.
*B60S 1/34* (2006.01)
*B60S 1/04* (2006.01)
*B60S 1/52* (2006.01)

(52) U.S. Cl.
CPC ........... *B60S 1/3415* (2013.01); *B60S 1/0497* (2013.01); *B60S 1/524* (2013.01)

(58) Field of Classification Search
CPC ......... B60S 1/524; B60S 1/3862; B60S 1/381
See application file for complete search history.

(56) References Cited

U.S. PATENT DOCUMENTS 2,483,243 A * 9/1949 Smulski ................ B60S 1/3415
15/250.04
2004/0226127 A1* 11/2004 Kaplan .................... B60S 1/488
239/128

(Continued)

FOREIGN PATENT DOCUMENTS

CN  103192800 A  7/2013
CN  104973022 A  10/2015

(Continued)

OTHER PUBLICATIONS

DE102007062304A1 (machine translation) (Year: 2009).*

(Continued)

*Primary Examiner* — Andrew A Horton
(74) *Attorney, Agent, or Firm* — Osha Bergman Watanabe & Burton LLP

(57) ABSTRACT

A replacement kit (100) for a wiper mounted at the end of a motor vehicle wiper arm (10), the kit comprising at least one wiper (102, 102c, 102p) equipped with an inbuilt fluid spraying device comprising at least one circulation canal (126) and a fluid inlet cannula (104), and at least one fluid distribution tube (106) configured to be coupled at one end to said wiper (102, 102c, 102p) and at its opposite end to a fluid supply circuit supplying fluid coming from a reservoir (11) of the vehicle, the replacement kit also comprising a coupling (108) configured to allow a fluidic connection between the supply circuit and the at least one fluid distribution tube (106), as well as at least one fixing means (110, 116) for holding the distribution tube in position along the wiper arm (10).

10 Claims, 4 Drawing Sheets

(56) References Cited

U.S. PATENT DOCUMENTS

| | | |
|---|---|---|
| 2007/0143947 A1 | 6/2007 | Harita et al. |
| 2010/0089417 A1 | 4/2010 | Nelson |
| 2011/0047738 A1 | 3/2011 | Gross et al. |
| 2014/0250623 A1* | 9/2014 | Hochertz .................. B60S 1/38 15/257.01 |
| 2015/0082573 A1* | 3/2015 | Paskov .................. B60S 1/487 15/250.04 |
| 2017/0190320 A1* | 7/2017 | Caillot .................... B60S 1/487 |

FOREIGN PATENT DOCUMENTS

| | | | |
|---|---|---|---|
| CN | 107531215 A | 1/2018 | |
| DE | 102007062304 A1 * | 6/2009 | ............ B60S 1/3862 |
| DE | 102007062304 A1 | 6/2009 | |
| DE | 102008021457 A1 | 11/2009 | |
| DE | 102014017602 A1 | 6/2015 | |
| EP | 2262671 A1 | 12/2010 | |
| EP | 2813402 A1 | 12/2014 | |
| FR | 2971471 A1 | 8/2012 | |
| JP | H05-507896 A | 11/1993 | |
| JP | H09-142262 A | 6/1997 | |
| JP | 2017-77865 A | 4/2017 | |

OTHER PUBLICATIONS

Notice of Reasons for Refusal in corresponding Japanese Application No. 2021-537792, dated Jul. 22, 2022 (8 pages).

International Search Report and Written Opinion in corresponding International Application No. PCT/EP2019/082977, dated Feb. 11, 2020 (11 pages).

Office Action issued in Chinese Application No. 201980086604.3 dated Apr. 19, 2023 (21 pages).

Office Action Issued is Corresponding JP Application No. 2021-537792, dated Aug. 1, 2023. (10 pages with English Translation).

Office Action Issued in Corresponding CN Application No. 201980086604.3, dated Oct. 18, 2023. (8 Pages).

* cited by examiner

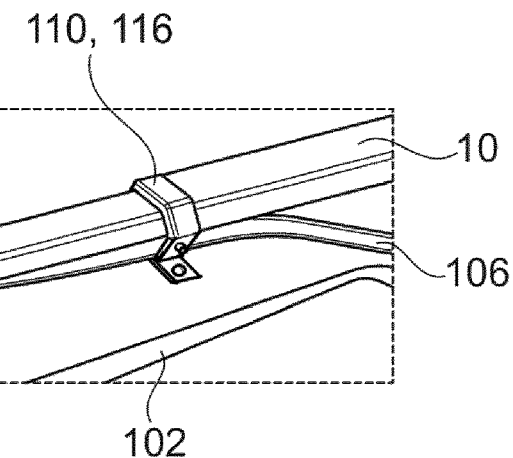
Fig. 5
Fig. 6
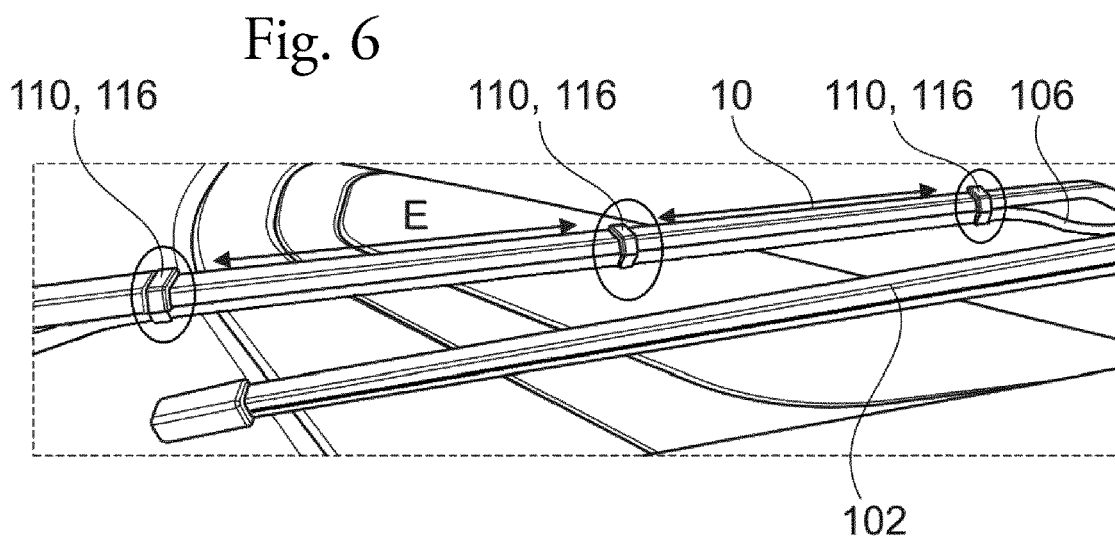
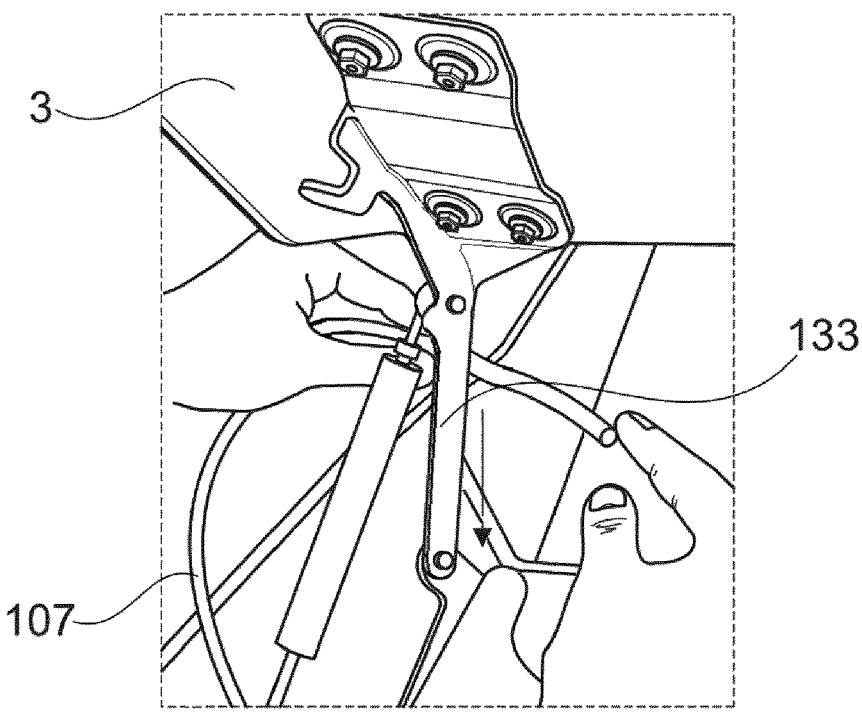
Fig. 7

WIPER BLADE REPLACEMENT KIT

The present invention relates to the field of wipers for glazed surfaces, notably for a windshield or rear window of a motor vehicle. More specifically, the invention relates to a wiper replacement kit having the particular feature of being able to incorporate a function of spraying a cleaning fluid.

To facilitate the cleaning of the glazed surfaces by one or more wipers, provision is made for the cleaning fluid, particularly screen-wash fluid, to be sprayed onto the glazed surface when the latter is not wetted by rainwater. These days, it is standard practice to spray the screen-wash fluid via fixed nozzles arranged in the vicinity of the glazed surface that is to be cleaned, and conventionally along a lower part of the glazed surface, particularly of the windshield or of the rear window of the motor vehicle.

Motor vehicle equipment manufacturers are nowadays envisioning incorporating functions into wipers, particularly the fluid ejection nozzles, the objective being to replace the aforementioned fixed nozzles. These fixed nozzles notably have the disadvantage of producing a jet of cleaning fluid for which the region of impingement of the fluid on the windshield or on the rear window is restricted, certain regions of the windshield then being devoid of fluid. Furthermore, spraying cleaning fluid via these fixed nozzles entails spraying continuously throughout the cleaning time, and this implies, on the one hand, overconsumption of cleaning fluid and, on the other hand, the fact that the liquid may run along the glazed surface before the wiper reaches the region that is to be cleaned, such that the spraying of cleaning fluid may impair the visibility for the driver.

In this context, motor vehicle equipment manufacturers have proposed wipers that incorporate the fluid spraying function, via ducts attached to or incorporated into the structure of the wiper, and pierced with ejection orifices, the ducts thus being as one with the back and forth movement of the wiper. These wipers are equipped with a plurality of spray orifices so as to improve the wettability of the glazed surface, notably by a better distribution of the washer fluid to be sprayed onto the glazed surface. The prior art EP 2 262 671 A1 describes such a device for spraying fluid onto the glazed surface of a motor vehicle.

It is not conceivable to integrate a wiper as described in the above-mentioned document into an existing vehicle as it stands, when such a vehicle was originally fitted with a wiper that did not have an inbuilt spray device. In such cases, as was specified earlier, the spray nozzles for the spray system are then positioned in a fixed manner around the glazed surface of the vehicle. Consequently, replacing a standard wiper with a wiper equipped with an inbuilt fluid spraying device would need to be accompanied by the fitting of a specific cleaning-fluid supply system which, leaving aside the fact that it would not be economical, would be bulky. Furthermore, it should be noted that fitting a wiper that has an inbuilt fluid spraying device will definitely entail modifying the habits of the user to encourage them to spray fluid using the device built into the wiper in preference to the fixed nozzles arranged in the vicinity of the glazed surface. Supplying cleaning fluid to these nozzles then becomes superfluous and implies that there are bulky means that are not used.

It is an objective of the present invention to overcome the above-described disadvantage by conceiving of a solution that allows a standard wiper, which may notably be fitted to a vehicle as original equipment, to be replaced with a new wiper equipped with an inbuilt fluid spraying device. The replacement kit proposed by the invention is particularly well suited for marketing through automotive-parts sales networks known as after sales or aftermarket networks.

The present invention thus offers a replacement kit for a wiper mounted at the end of a motor vehicle wiper arm, the kit comprising at least one wiper equipped with an inbuilt fluid spraying device comprising at least one circulation canal and a fluid inlet cannula, and at least one fluid distribution tube configured to be coupled at one end to said wiper and at its opposite end to a fluid supply circuit supplying fluid coming from a reservoir of the vehicle, the replacement kit also comprising a coupling configured to allow fluidic connection between the supply circuit and the at least one fluid distribution tube as well as at least one fixing means for holding the distribution tube in position along the wiper arm.

According to a set of features of the invention, taken alone or in combination, the following can be provided:

The replacement kit further comprises a fluid supply tube configured to form the supply circuit able to be coupled at one end to the reservoir of cleaning fluid and at another end to the coupling.

The replacement kit comprises two wipers respectively equipped with an inbuilt fluid spray device and two fluid distribution tubes respectively associated with each of the wipers, the coupling being configured to allow fluidic connection of each of the two fluid distribution tubes to the supply tube.

The coupling comprises at least one nonreturn device configured to prevent fluid from circulating from one or the other of the distribution tubes toward the supply tube.

One of the two distribution tubes is equipped with a fluid pressure regulating device. Provision may notably be made for a first of the two wipers to be devoted to wiping one part of a glazed surface in front of the driver of the vehicle and for a second of the two wipers to be devoted to wiping a part of the glazed surface in front of the passenger of the vehicle, and for the distribution tube associated with the second of the two wipers to be equipped with a fluid pressure regulating device.

The regulating device is pre-dimensioned to adopt a specific position according to the sizing of one or more wipers of the replacement kit and/or according to the performance of the pump associated with the fluid reservoir and the supply tube.

The replacement kit further comprises fixing members for fixing the supply tube to the structure of the vehicle, said fixing members being self-adhesive.

The replacement kit further comprises a hose clamp clamping the at least one distribution tube around an elastic return element secured to the wiper arm.

The wiper or wipers are configured in such a way that the fluid inlet cannula is positioned at the center of the wiper, in the region of a connector connecting the wiper to the wiper arm. Alternatively, provision may be made for the inlet cannula to be positioned on one of the wiper end fittings.

The invention also relates to a method for replacing a wiper fitted to a vehicle equipped with a cleaning system having fixed spray nozzles arranged in the vicinity of the glazed surface that is to be cleaned by the wiper, using the replacement kit as described hereinabove, during which method there is performed a step of removing the wiper that is to be replaced from the associated wiper arm, a step of fitting the replacement wiper equipped with a fluid spray device, a step of connecting a distribution circuit of the replacement wiper and a step of modifying the supply of fluid coming from a fluid reservoir of the vehicle. During this replacement method, provision is also made for:

said step of fitting the replacement wiper to consist, in one order or the other, in assembling the replacement wiper with the fluid distribution tube, these two elements being taken from the replacement kit, and in installing the wiper on the wiper arm, and then consisting in fixing the distribution tube along the arm using at least one of the fixing means from the replacement kit, the step of connecting a distribution circuit of the replacement wiper to consist at least in connecting a distribution tube to a coupling taken from the replacement kit, the step of modifying the supply to consist at least in disconnecting a supply pipe connecting the fluid reservoir and the spray nozzles arranged in the vicinity of the surface that is to be cleaned, and reconnecting the previously-disconnected pipe, or a supply pipe from the replacement kit, to said coupling.

Further features, details and advantages of the invention will become more clearly apparent from reading the description, which is provided below by way of illustration and with reference to drawings in which:

FIG. 1 is a general view of a vehicle equipped with a standard device for wiping the glazed surface, namely a device in which the wipers are made to wipe a glazed surface onto which fluid can be sprayed via fixed nozzles, in this instance two of them, distributed in the vicinity of said glazed surface, FIG. 1 showing, in dotted lines, a fluid reservoir and supply pipes connecting the nozzles to the reservoir;

FIG. 5, FIG. 6 and FIG. 7 illustrate successive steps in a method for replacing a standard wiper with a wiper from the replacement kit according to the invention;

Figure 1:
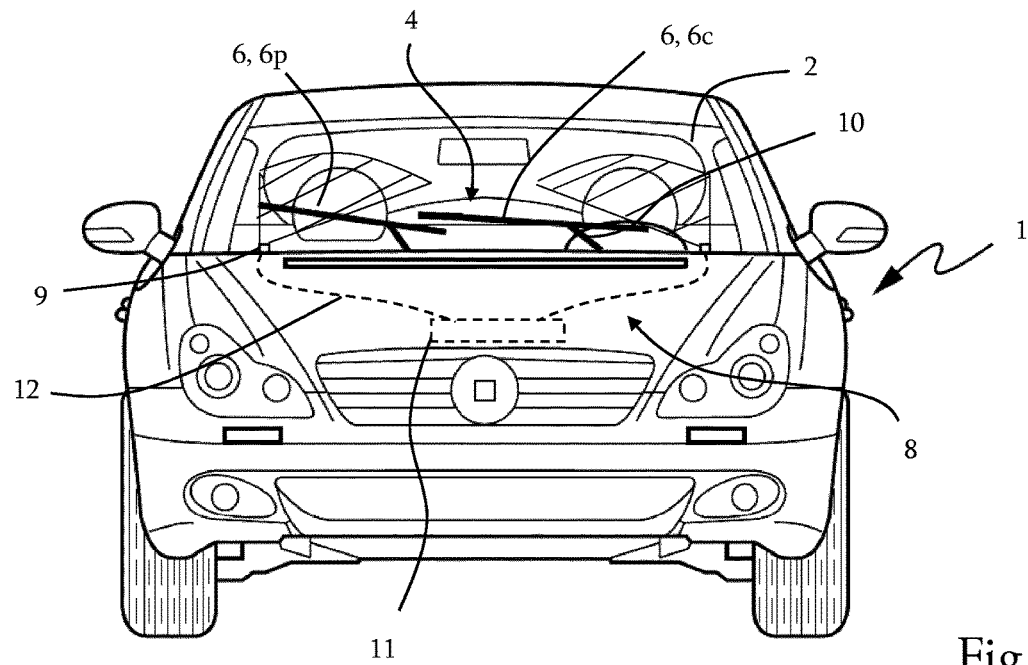

The figures set out the invention in detail for implementing the invention, it being, of course, possible for said figures to serve to better define the invention if necessary.

It should be noted first of all that, for ease of reading, elements that are common to several figures retain the same reference numeral across these figures.

FIG. 1 illustrates a vehicle 1 notably comprising a windshield forming a glazed surface 2 that is to be cleaned. A suitable wiping device 4 is provided on the vehicle and notably comprises two wipers 6 and a fluid spray system 8 distinct from these wipers, for spraying fluid onto the windshield.

In particular, it is possible to distinguish among the two wipers a driver-side wiper 6c and a passenger-side wiper 6p, the driver-side wiper being arranged more particularly to clean that portion of the glazed surface 2 that is situated in front of the driver. The driver-side wiper 6c may notably be larger than the passenger-side wiper 6p, in order to sweep across a larger surface area.

Each wiper is mounted at the free end of a arm 10 driven in rotation by a driving device not visible here so as to allow the corresponding wiper to sweep across the glazed surface.

The fluid spray system 8 for spraying fluid onto the windshield is configured to spray cleaning fluid, such as screen-wash fluid, air, water, onto all or part of the glazed surface, particularly when the glazed surface is not wet enough to be able to be cleaned by the wipers.

The fluid spray system 8 comprises one or more spray nozzles 9, a storage reservoir 11 for the chosen cleaning fluid, and a set of pipes 12 for fluidically connecting the reservoir to the spray nozzles. More particularly, the nozzles are fixed and distributed in the vicinity of the glazed surface, in this instance along the lower part of the glazed surface. The pipes are also configured to allow hydraulic connection of each of the nozzles to the reservoir so as to convey fluid toward these nozzles.

In the example illustrated in FIG. 1, the nozzles 9 are hydraulically connected to the storage reservoir 11, in a simplified way, using a pipe 12 specific to each nozzle and leading from the reservoir. It should be noted that other arrangements may be provided, particularly an arrangement in which a main pipe connects one of the nozzles to the reservoir and a secondary pipe is branched off the main pipe upstream of the nozzle to supply another spray nozzle.

As was specified hereinabove, the invention provides a wiper replacement kit 100 that allows a standard wiper 6c, 6p fitted to the vehicle as original equipment, namely a wiper that does not have an inbuilt fluid spray system, to be substituted by a wiper 102 equipped with an inbuilt device for spraying cleaning fluid. In that way, it then becomes possible to spray fluid in a more targeted fashion directly ahead of the passage of the wiper across the glazed surface, and the cleaning of the glazed surface is improved while economizing on the quantity of fluid used. The benefit of using a wiper 102 equipped with an inbuilt cleaning fluid spray device is known per se and the invention, through the configuration of the replacement kit 100, is able to supply such a wiper together with the hardware needed for modifying the fluidic coupling of the reservoir. Indeed it is appropriate for the fluid to be directed not toward the fixed nozzles in the vicinity of the glazed surface that is to be cleaned, but rather toward the wipers.

Thus, the replacement kit 100 comprises at least one wiper 102 equipped with an inbuilt fluid spraying device and fitted with a fluid inlet cannula 104 to allow the reservoir to be coupled to the inbuilt fluid spray device, and it further comprises at least one fluid distribution tube 106 configured to be coupled at one end to the inlet cannula 104 for this wiper 102, and to be coupled at its opposite end to the storage reservoir 11, whether this be directly or indirectly, via the coupling 108 providing a branching of a fluid distribution circuit. The kit further comprises fixing means 110 to hold the fluid distribution tube in position.

Figure 2:
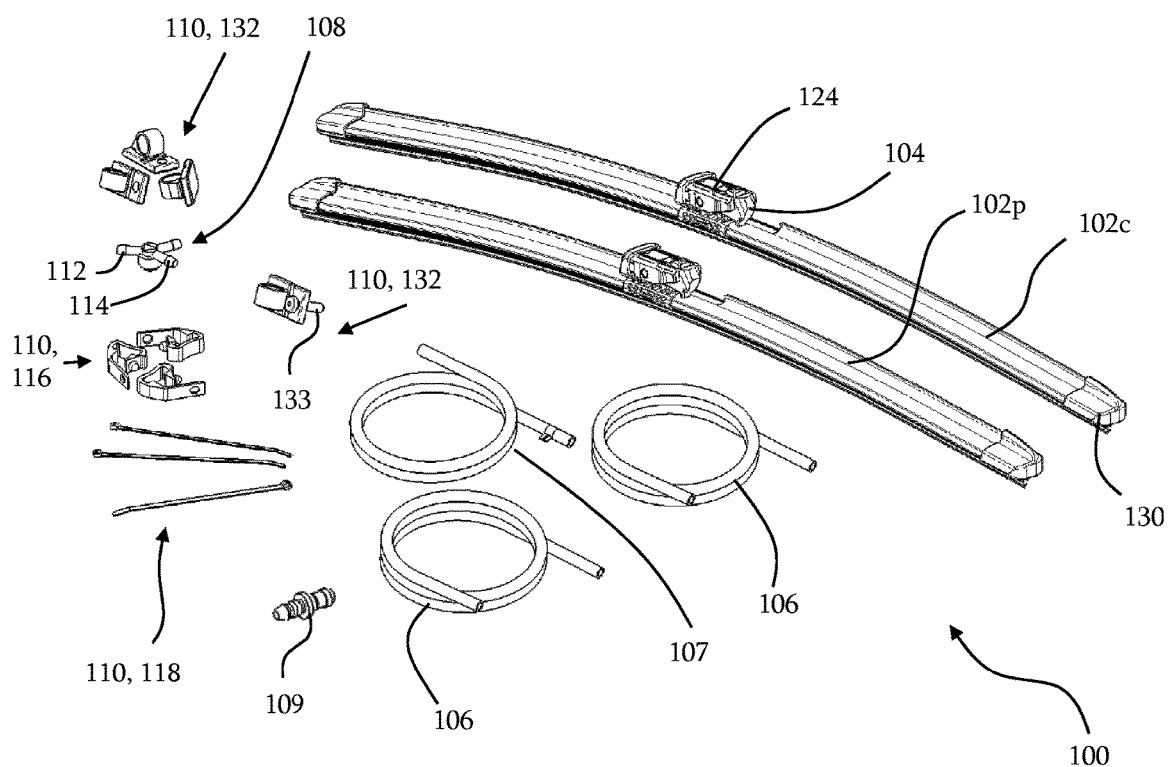
FIG. 2 is a depiction of a wiper replacement kit according to a first embodiment of the invention, in which kit there are provided two wipers, respectively equipped with an inbuilt fluid spray device, as well as pipes and fixing means.

FIG. 2 illustrates a first embodiment of the replacement kit according to the invention, the particular feature being that it comprises two wipers 102 respectively equipped with an inbuilt cleaning fluid spray device. Provision could be made for the kit to comprise two wipers with just one of them, the driver-side wiper, being equipped with such a spray device. The kit also comprises distribution tubes 106, configured to be coupled respectively to one of the wipers, and at least one fixing means 110 allowing the tube to be fixed to the arm associated with the wiper.

More specifically here, the replacement kit 100 comprises two wipers 102, a plurality of tubes including distribution tubes 106 and a supply tube 107, a plurality of fixing means 110, and a coupling 108.

The distribution tubes can be distinguished from the supply tube in that the supply tube 107 is able to be coupled to the cleaning fluid storage reservoir 11 of the vehicle, so as to form a fluid supply circuit, and in that the distribution tubes 106 are able to be coupled to the inlet cannulas 104 formed on the wipers.

Figure 9:
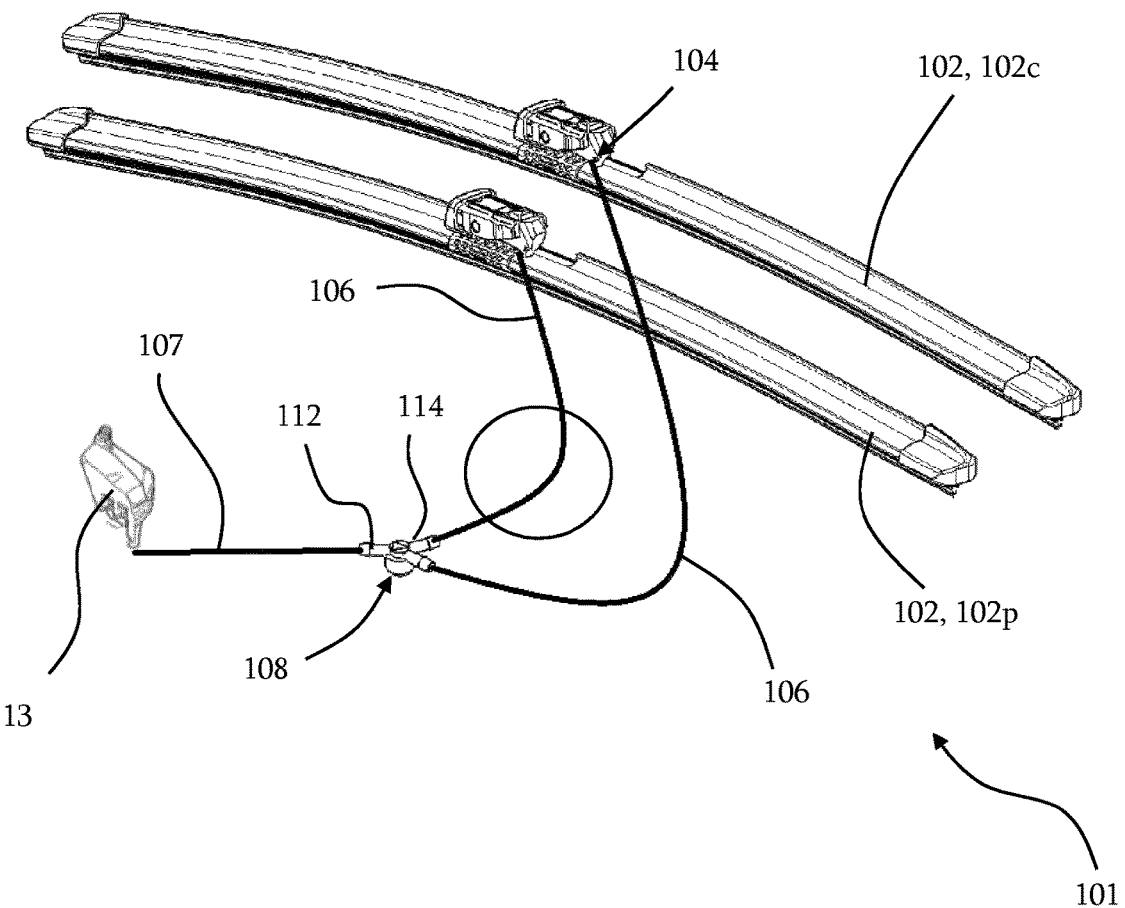
FIG. 9 is a schematic illustration of the fluidic coupling of the wipers of a replacement kit similar to that of FIG. 1, the pipes provided in the kit here allowing the wipers to be connected to a pump associated with the fluid reservoir which is not depicted here.

The coupling 108 here is Y-shaped, with one inlet end fitting 112 able to be coupled to the supply tube 107 and two outlet end fittings 114 respectively able to be coupled to one of the distribution tubes 106. It will be appreciated that, as illustrated in FIG. 9, coupling all of these components allows fluid to be conveyed from the storage reservoir 11 to the coupling 108 via the supply tube 107, the fluid then being directed simultaneously toward the driver-side wiper 102c via an outlet end piece 114 of the coupling 108 and the corresponding distribution tube 106, and towards the passenger-side wiper 102p via the other outlet end piece 114 of the coupling and the corresponding distribution tube 106.

The coupling 108 may notably comprise a nonreturn device, for example in the form of a ball valve, not depicted here. The benefit of this nonreturn device is that it ensures that any fluid not sprayed in a previous cleaning operation and still present between the coupling and the wipers is available as quickly as possible for the next cleaning operation.

The fixing means 110 of the replacement kit notably comprise a plurality of clips 116 configured to allow each distribution tube 106 to be fixed along the arm 10 on which one of the wipers 102 of the replacement kit 100 is mounted, and where appropriate to allow each distribution tube 106 to be fixed to the structure of the vehicle between the coupling 108 and that part of the tube that is held on the arm by the clips.

The fixing means 110 of the clip may further comprise a plurality of hose clamps 118 allowing the position of each of the tubes 106, 107 with respect to the elements along which they run to be adjusted, and for example for adjusting the position of a distribution tube at the base of the corresponding wiper arm.

The fixing means 110 of the kit may further comprise support rings.

The wiper 102 comprises, on the one hand, a body 120 acting as a support to a wiper blade 122, after having been pressed firmly against the glazed surface that is to be cleaned, and in this instance having at least one stiffening strip 123 and, on the other hand, a connector 124, secured to the wiper and able to allow the wiper to be fixed to the corresponding arm 10.

Figure 3:
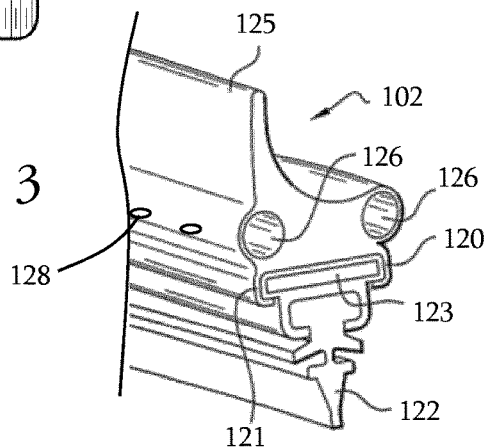
FIG. 3 is a view in cross section of a wiper equipped with an inbuilt fluid spray device forming part of the replacement kit according to the invention.

The wiper body 120, as illustrated in a view in cross section in FIG. 3 comprises a base 121 and an aerodynamic spoiler 125. In this instance, at the base, the wiper body comprises at least one circulation canal 126 and a plurality of orifices 128 allowing the fluid circulating along the canal to be ejected out of the wiper. The circulation canal 126 is supplied with fluid via the aforementioned inlet cannula 104. The cannula, the canal and the orifices form the inbuilt spray device as was mentioned earlier.

The inlet cannula 104 is positioned here at the level of the connector 124, as depicted schematically in FIG. 2, but it will be appreciated that, without departing from the context of the invention, the inlet cannula 104 could be positioned at the level of an end piece 130 of the wiper, the wiper 102 here comprising, in the example illustrated, two end pieces 130 positioned respectively one at each longitudinal end of this wiper.

The distribution tube 106 is dimensioned to be push-fitted onto the inlet cannula 104 so that the fluid circulating through the distribution tube can enter the inbuilt spray device on the wiper.

According to the invention, the distribution tube 106, coupled to the connector 124 of the wiper 102 is then fixed along the arm 10 using the fixing clips 116 from the replacement kit.

Figure 4:
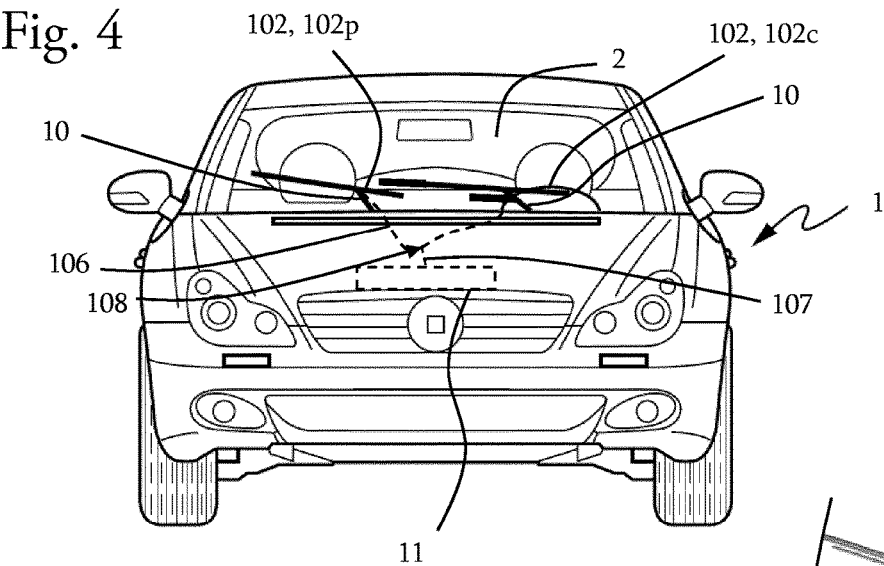
FIG. 4 is a view similar to that of FIG. 1, but in which the vehicle is now equipped with the two wipers of the replacement kit of FIG. 2, the fluidic supply via the reservoir, still illustrated in dotted lines, being modified.

FIG. 4 illustrates the vehicle once the wipers 102 from the replacement kit 100 have been mounted on their respective arms 10. It will be appreciated that this replacement results in a configuration in which the wipers are supplied with cleaning fluid. As a result, a demand for cleaning of a glazed surface involving the spraying of cleaning fluid onto the windshield causes cleaning fluid to be pumped from the storage reservoir 11 by a pump 13 associated with the reservoir 11 and illustrated in FIG. 9, and cleaning fluid to be conveyed toward the wipers 102 via, successively, the supply tube 107, the coupling 108 and the distribution tubes 106. The cleaning fluid circulates along inside the circulation canal or canals 126 formed in the body of the wiper and is sprayed onto the glazed surface via the spray orifices 128.

It should be noted that once the replacement has been made, the fixed nozzles 9 located in the vicinity of the glazed surface remain in position but are no longer active because they are no longer supplied with fluid.

The method for replacing the standard wipers 6, fitted as original equipment to the vehicle, with two wipers 102 respectively equipped with an inbuilt fluid spraying device will now be described with reference particularly to FIG. 5, FIG. 6 and FIG. 7, the method using the replacement kit 100 according to the first embodiment as has just been described.

In a first step, the user positions the arms 10 in such a way as to be able to remove the standard wipers 6 from these arms. Prior to, or else subsequent to, doing so, the user assembles a wiper 102 from the replacement kit 100, namely a wiper equipped with an inbuilt spray device, with a fluid distribution tube 106. To do this, the user push-fits one end of the distribution tube 106 around or into the inlet cannula 104 of the wiper. Because the distribution tube 106 and the wiper 102 form part of the same replacement kit 100 according to the invention, the dimensions of the end of the distribution tube 106 that is to be push-fitted and the corresponding dimensions of the inlet cannula 104, in this instance the diameter, are determined so that force-fitting is, on the one hand, possible and, on the other hand, sufficient, to ensure the fluidtightness of the assembly. By way of nonlimiting example, the inside diameters of the distribution tubes are of the order of 3.5 millimeters, and the outside diameters of the inlet cannulas are of the order of 5 millimeters. It will thus be appreciated that there is no need to provide hose clamps to maintain and therefore ensure the fluidtightness of this push-fit.

The user therefore mounts this assembly of two elements on the arm 10, making the end of the arm collaborate with the connector 124 of the wiper. The user is therefore faced with a wiper 102 which has been secured to the arm 10, and with a fluid distribution tube 106 which has been fixed at one end to the connector 124 of the wiper and which is free at its other end.

The user then takes a first fixing clip 116 from the replacement kit 100 and clips this clip around the arm 10 so as to then fix the distribution tube 106 along the arm using this fixing clip 116. This then results in an assembly as illustrated in FIG. 5. The user then takes similar fixing clips 116 and clips them around the arm 10 at regular intervals so as to then fix the distribution tube along the arm using each of the clips in succession. This then results in an assembly as illustrated in FIG. 6 with a distance between two adjacent fixing clips 116, indicated by an arrow E in this figure, of the order of 10 to 20 cm. It should be noted that the replacement kit may contain a number of fixing clips that varies according to the length of the arm to which the replacement wiper 102 is to be attached. The replacement kit 100 advantageously provides fixing clips 116 able to secure these wipers to any type of arm by allowing the distribution tube 106 to be fixed along any type of arm.

A specific type of fixing clip is provided for fixing the distribution tube 106 along the arm 10 in the vicinity of an elastic return element of the arm. In the known way, a spring is arranged in the volume of the arm in order to force the arm and the wiper it supports against the window that is to be wiped. When the arm is manipulated by the user and particularly raised off the windshield in order to allow a change of wiper or cleaning of the wiper blade, the spring is stretched. It is then advantageous according to the invention to provide a fixing clip as close as possible to the end of the spring to ensure that the position of the tube with respect to the spring is fixed and that the tube does not impede the deployment of the arm by trapping the spring.

For similar reasons, the user may then use the hose clamp 118 to surround the distribution tube 106 and the arm 10 in the vicinity of the opposite end of the spring, namely the end positioned closest to the structure of the vehicle from which the arm projects. The hose clamp should be tightened in such a way that it does not clamp the tube excessively and crush same. The hose clamp supplied in the replacement kit may notably have a tightening limit that is adapted to the outside diameter of the distribution tube present in that same replacement kit, said tightening limit being designed to nevertheless allow a small amount of crushing of the tube in order to limit the slipping of the clamp along the tube.

The user then passes the free end of the distribution tube 106 through a passage formed in the structure of the vehicle, at the base of the corresponding wiper arm 10. Each distribution tube 106 passes through a passage specific to it and which may notably be selected from the options offered by the standard fixed or removable structural elements of the vehicle.

The user then couples each free end of a distribution tube 106 to one of the outlet end pieces 114 of the Y-coupling 108 taken from the replacement kit 100 according to the invention. Once again, it is notable that the outlet end pieces 114 and the distribution tubes 106 have dimensions, notably diameters, tailored to a push-fitting of the outlet end pieces into the distribution tubes without the need to provide additional hose clamps. The user can adjust the length of the distribution tubes 106 so that the coupling 108 is positioned under the hood of the vehicle at a suitable point, with distribution tubes taut enough to prevent them from interfering with vehicle components that are housed under the hood. If appropriate, the user may employ self-adhesive fixing members 132, which may also be provided in the replacement kit for all of the fixing means 110, as can be seen in FIG. 2 to fix the position of the tubes under the hood. The user can readily distinguish in the replacement kit of the invention the fixing clips 116 that are to be used for fixing the distribution tubes along an arm and the fixing members 132 for fixing the distribution tubes along a vehicle structure under the hood. Specifically, the fixing clips 116 have a head that acts as a seat to accept the tube and a body comprising means for clamping onto the arm by clip-fastening and are able to pass around the arm. The fixing members 132 also have a head that acts as a seat to accept the tube, but have a body comprising a flat surface of which the face facing away from the seat is fitted with a self-adhesive coating. As an alternative or in addition to the adhesive-fastening solutions, these fixing members may comprise a clamping screw 131 for more robust attachment of the fixing member to a suitable region of the vehicle, notably a region in which a tapped bore is already provided on the structure of the vehicle.

Following this connecting of the Y-coupling 108 to the distribution tubes 106 or beforehand, the order of events being of no importance to the invention, the user couples the supply tube 107 provided in the replacement kit between the Y-coupling 108 on one side and the cleaning fluid storage reservoir 11 or the associated pump 13.

In instances in which the replacement kit 100 comprises a supply tube 107, the user removes the existing supply tube from the standard vehicle and replaces it with the supply tube supplied in the replacement kit. As already stated, the supply tube is easily connected to the Y-coupling without the need for additional components because these elements both come from the replacement kit. The kit may also in this case comprise a coupling element 109 and, for example, a coupling element without a nonreturn valve as illustrated in FIG. 2, allowing the fluidtight connection between the supply tube 107 of the replacement kit and the end piece of the storage reservoir or of the pump to which end piece the supply tube specific to the replacement kit 100 is coupled.

Alternatively, whether or not the replacement kit has a supply tube, the user may retain the standard supply tube, leaving in place the connection to the reservoir or to the associated pump and simply disconnecting the supply tube on the side of the fixed spray nozzles 9 arranged around the glazed surface, then connecting this supply tube to the Y-coupling 108. It will be appreciated that, here, the coupling element 109 mentioned earlier would be used to provide a fluidtight connection of the supply tube and of the Y-coupling which do not both come from the replacement kit.

In both instances, whether the supply tube remains the original supply tube or else corresponds to the supply tube 107 from the replacement kit, it is advantageous for the user to route it behind the hinge 133 for the opening of the hood 3, as illustrated in FIG. 7, in order to prevent this supply tube from becoming trapped when the hood is opened and closed. It will be appreciated that this problem scenario does not arise when the supply tube is connecting the reservoir to the fixed spray nozzles because no slack for connecting the nozzles is needed.

Figure 8:
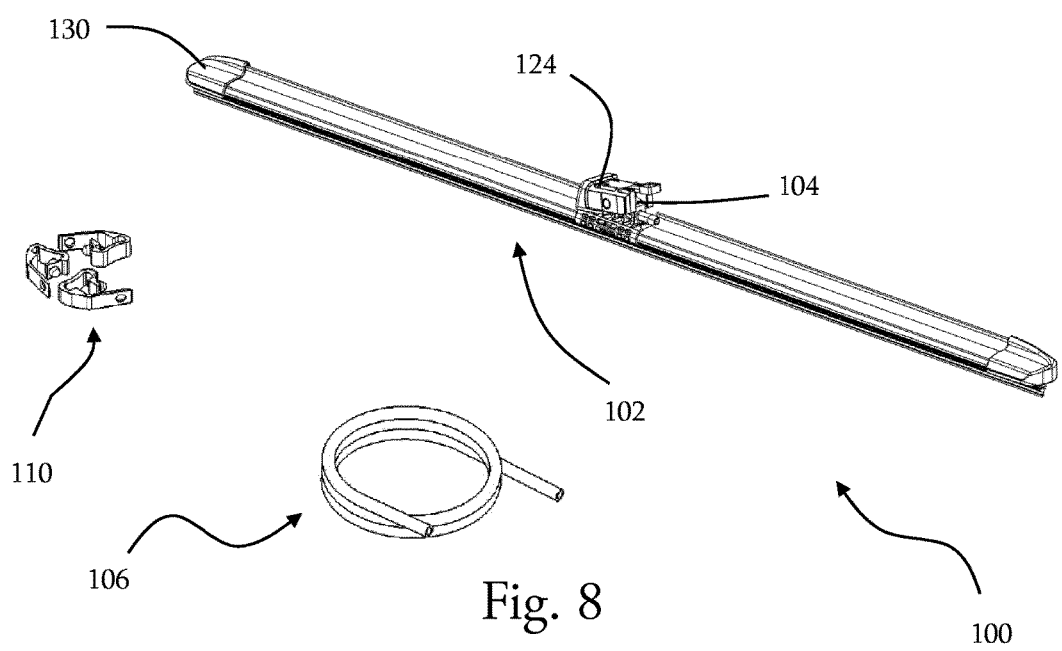
FIG. 8 is a depiction of a wiper replacement kit according to a second embodiment of the invention, in which kit there are provided one single wiper equipped with an inbuilt fluid spray device, and a single pipe and fixing means.

It is evident from the foregoing that, as illustrated in FIG. 8, the replacement kit needs to comprise essentially at least one wiper 102 equipped with an inbuilt spray device, at least one distribution tube 106, and at least one coupling 108.

FIG. 9 illustrates a cleaning assembly 101 equipping a vehicle 1 after the standard wipers 6 have been replaced with two wipers 102 equipped with an inbuilt spray device. This figure shows the distinction between the driver-side wiper 102c and the passenger-side wiper 102p, both equipped with an inbuilt spray device, the driver-side wiper 102c here being longer than the passenger-side wiper 102p.

One of the distribution tubes 106 fluidically connecting one of the wipers of the replacement kit, and more particularly the tube associated with the passenger-side wiper 102*p* is notable in that it houses a pressure regulating device 134 for regulating the pressure of the fluid circulating in the tube.

The pressure regulating device consists of a controlled member 136 positioned across the bore section of the distribution tube and capable of adopting different positions ranging from a position of total obstruction to a fully-clear position, passing through one or more positions of partial obstruction. The change in bore section alters the pressure of the fluid caused to be sprayed by the inbuilt spray device in one and the other of the wipers.

Figure 10:
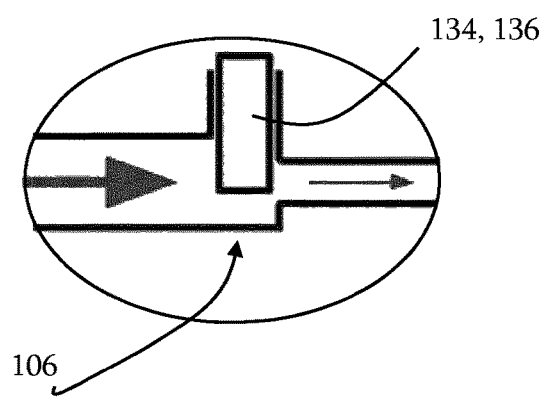
FIG. 10 is a detail view of one of the pipes connecting one of the wipers of the replacement kit, having the particular feature that it houses a device for regulating the pressure of the fluid circulating in the pipe.

In the example illustrated in FIG. 10, the controlled member 136 consists of a member mounted with the ability to effect a translational movement in a direction perpendicular to the direction of flow of the fluid circulating in the tube, without this embodiment being limiting of the invention.

It will be appreciated that such a regulating device could be implemented on a distribution tube when the replacement kit comprises just one single wiper equipped with an inbuilt fluid spray device. In that case, the regulating device may be configured so that each of the specific positions is dependent on the sizing of the associated wiper and the performance of the pump associated with the fluid reservoir.

When the replacement kit comprises two wipers and one of the two is equipped with a regulating device, the latter may be configured so that each of the specific positions is dependent on the sizing of the wipers of the kit and the performance of the pump associated with the fluid reservoir.

The controlled member 136 here has an advantageous position, partially obstructing the bore section for the fluid, so that a small quantity of pressurized fluid flows toward the passenger-side wiper 102*p*. This ensures that a large quantity of fluid is directed toward the other distribution tube, namely the one distributing to the driver-side wiper 102*c*, and that fluid can be sprayed in quantity and uniformly via each of the spray nozzles formed in the driver-side wiper 102*c*.

It will be appreciated from reading the foregoing that the present invention proposes a replacement kit configured to allow a vehicle to be fitted with "Aquablade" wipers even when the vehicle was fitted as original equipment with standard wipers without inbuilt fluid spray nozzles, these nozzles being originally provided on the periphery of the windshield. It is particularly notable that the replacement kit according to the invention allows a fitting that is advantageous insofar as the hydraulic coupling of the wiper to the screen-wash fluid reservoir of the vehicle can be achieved simply and quickly.

The invention is not limited to the means and configurations described and illustrated herein, however, and also extends to all equivalent means or configurations and to any technically functional combination of such means. In particular, the number and shape of the clips used for fixing the supply tube to the arm may vary. By way of additional nonlimiting example, that part of the supply tube that runs between the arm and the fluid storage reservoir could follow paths other than the one indicated in the detailed description of one example of fitting.

Of course, the features, alternatives and different embodiments of the invention can be combined with one another, in various combinations, provided that they are not incompatible or mutually exclusive. In particular, it may be possible to conceive of variants of the invention that comprise only a selection of features described below in isolation from the other features described, if this selection of features is sufficient to confer a technical advantage or to differentiate the invention from the prior art.

The invention claimed is:

1. A replacement kit for a wiper mounted at one end of a wiper arm of a motor vehicle, the kit comprising:
    at least one wiper equipped with an inbuilt fluid spraying device comprising at least one circulation canal and a fluid inlet cannula;
    at least one fluid distribution tube configured to be coupled at one end to said wiper and at its opposite end to a fluid supply circuit supplying fluid coming from a reservoir of the vehicle;
    a coupling configured to allow fluidic connection between the supply circuit and the at least one fluid distribution tube;
    at least one fixing means for holding the distribution tube in position along the wiper arm; and
    wherein the distribution tube is equipped with a fluid pressure regulating device that includes a member mounted effecting a translational movement in a direction perpendicular to a direction of flow of a fluid circulating in the tube.

2. The replacement kit as claimed in claim 1, further comprising: a fluid supply tube configured to form the supply circuit able to be coupled at one end to the reservoir of cleaning fluid and at another end to said coupling.

3. The replacement kit as claimed in claim 2, further comprising: fixing members for fixing the supply tube to a structure of the vehicle.

4. The replacement kit as claimed in claim 3, wherein said fixing members being self-adhesive.

5. The replacement kit as claimed in claim 1, wherein the coupling comprises at least one nonreturn device configured to prevent fluid from circulating from one or other of the distribution tubes toward the supply circuit.

6. The replacement kit as claimed in claim 1, wherein the regulating device is pre-dimensioned to adopt a specific position according to the sizing of one or more wipers of the replacement kit.

7. The replacement kit as claimed in claim 1, further comprising: a hose clamp clamping the at least one distribution tube around an elastic return element secured to the wiper arm.

8. The replacement kit as claimed in claim 1, wherein the at least one wiper is configured in such a way that the fluid inlet cannula is positioned at the center of the wiper, in the region of a connector connecting the wiper to the wiper arm.

9. A method for replacing a wiper fitted to a vehicle equipped with a cleaning system having fixed spray nozzles arranged in the vicinity of a glazed surface that is to be cleaned by the wiper, the method using a replacement kit comprising:
    at least one wiper equipped with an inbuilt fluid spraying device comprising at least one circulation canal and a fluid inlet cannula, and
    at least one fluid distribution tube configured to be coupled at one end to said wiper and at its opposite end to a fluid supply circuit supplying fluid coming from a reservoir of the vehicle,
    the replacement kit further comprising a coupling configured to allow fluidic connection between the supply circuit and the at least one fluid distribution tube,
    at least one fixing means for holding the distribution tube in position along a wiper arm, and
wherein the wiper is a standard wiper fitted to the vehicle as an original equipment,
wherein the method comprises:

removing the wiper that is to be replaced from the associated wiper arm;

fitting the replacement wiper equipped with a fluid spray device, connecting a distribution circuit of the replacement wiper; and modifying the supply of fluid coming from a fluid reservoir of the vehicle wherein fitting the replacement wiper comprises:
   assembling the replacement wiper with a fluid distribution tube, these two elements being taken from the replacement kit,
   installing the wiper on the wiper arm, and
   fixing the distribution tube along the arm using at least one of the fixing means from the replacement kit, wherein connecting a distribution circuit of the replacement wiper comprises connecting a distribution tube to a coupling taken from the replacement kit,
   modifying the supply comprises disconnecting a supply pipe connecting the fluid reservoir and the spray nozzles arranged in the vicinity of the surface that is to be cleaned, and reconnecting the previously-disconnected pipe, or a supply pipe from the replacement kit, to said coupling, and wherein the distribution tube is equipped with a fluid pressure regulating device that includes a member mounted effecting a translational movement in a direction perpendicular to a direction of flow of a fluid circulating in the tube.

10. A replacement kit for a wiper mounted at one end of wiper arms of a motor vehicle, the kit comprising:
   at least one wiper equipped with an inbuilt fluid spraying device comprising at least one circulation canal and a fluid inlet cannula;
   at least one fluid distribution tube configured to be coupled at one end to said wiper and at its opposite end to a fluid supply circuit supplying fluid coming from a reservoir of the vehicle;
   a coupling configured to allow fluidic connection between the supply circuit and the at least one fluid distribution tube;
   at least one fixing means for holding the distribution tube in position along the wiper arm;
   two wipers respectively equipped with the inbuilt fluid spray device and two fluid distribution tubes respectively configured to be coupled at one end to the inlet cannula of each of the wipers, the coupling being configured to allow fluidic connection of each of the two fluid distribution tubes to the fluid supply circuit, and
   wherein the one of the two distribution tubes is equipped with a fluid pressure regulating device that includes a member mounted effecting a translational movement in a direction perpendicular to a direction of flow of a fluid circulating in the tube.

* * * * *